United States Patent [19]

Bose

[11] Patent Number: 5,046,685

[45] Date of Patent: Sep. 10, 1991

[54] FIXED CIRCULAR WING AIRCRAFT

[76] Inventor: Phillip R. Bose, 2088 Ahneita Dr., Pleasant Hill, Calif. 94523

[21] Appl. No.: 376,716

[22] Filed: Jul. 7, 1989

Related U.S. Application Data

[63] Continuation-in-part of Ser. No. 117,194, Nov. 3, 1987, abandoned.

[51] Int. Cl.⁵ .............................................. B64C 29/00
[52] U.S. Cl. .................................. 244/23 C; 244/12.2; 244/2
[58] Field of Search ............... 244/2, 12.2, 23 C, 73 R

[56] References Cited

U.S. PATENT DOCUMENTS

| | | | |
|---|---|---|---|
| 2,014,051 | 9/1935 | Nishi | 244/23 C |
| 2,468,787 | 5/1949 | Sharpe | 244/12.2 |
| 2,730,398 | 1/1956 | Hoested | 244/2 |
| 2,807,428 | 9/1957 | Wibault | 244/23 C |
| 2,990,137 | 6/1961 | Willis | 244/12.2 |
| 3,034,747 | 5/1962 | Lent | 244/23 C |
| 3,041,009 | 6/1962 | Wharton | 244/12.2 |
| 3,181,811 | 5/1965 | Maksim | 244/73 R |
| 3,489,374 | 1/1970 | Morcom | 244/12.2 |
| 3,572,613 | 3/1971 | Porter | 244/12.2 |
| 3,785,592 | 1/1974 | Kerruish | 244/23 C |
| 3,871,602 | 3/1975 | Kissinger | 244/13 |
| 4,044,972 | 8/1977 | Anker-Holth | 244/12.2 |
| 4,312,483 | 1/1982 | Bostan | 244/12.2 |
| 4,601,444 | 7/1986 | Lindenbaum | 244/2 |

Primary Examiner—Joseph F. Peters, Jr.
Assistant Examiner—Anne E. Bidwell
Attorney, Agent, or Firm—Burns, Doane, Swecker & Mathis

[57] ABSTRACT

A heavier-than-air craft having a cylindrical external configuration comprising a single annular airfoil forming a circumferential lift wing. This fixed circular wing is surrounded by a circular fuselage of substantially the same diameter, closely spaced axially above and below the outer periphery of the annular airfoil, to allow radial air flow over and under substantially the full circumference of the airfoil. The radial air flow is induced through an axial opening in the center of one surface of the circular fuselage by an engine driven propeller, fan or jet effect.

19 Claims, 5 Drawing Sheets

FIXED CIRCULAR WING AIRCRAFT

BACKGROUND OF THE INVENTION

This application is a continuation-in-part of my application Ser. No. 07/117,194 filed Nov. 3, 1987.

FIELD OF THE INVENTION

The present invention relates to vertical take-off and landing heavier-than-air aircraft. More particularly, it relates to helicopter type aircraft in which the lifting airfoil is stationary relative to the load and control-carrying fuselage. An annular wing member is stationary within an enclosing fuselage of substantially the same diameter and having a peripheral opening around the perimeter of the fuselage for air flow over and under the wing. The center portion of one of the fuselage covering surfaces is open so that a propeller, fan, or jet creates radial air flow either inwardly or outwardly over the annular wing to generate lift. Control surfaces, serving the purposes of conventional flaps, brakes, ailerons, elevators or rudders, cooperate between the internal fuselage and wing surfaces to control flight of the aircraft.

DESCRIPTION OF THE PRIOR ART

It has been the practice in circular wing aircraft to obtain lift by the resultant action of controlled downward jets of air created by rotation of the airfoil member to induce sufficient air flow to lift the aircraft or induce flow over airfoil contours, as assisted by fins, slots, valves and gates to create such lift. Such aircraft have used exhaust gases from gas turbines, compressors or propellers to induce air flow either inwardly or outwardly relative to the airfoil. Direct lift from lifting propellers has also been used. Such aircraft are maneuvered laterally and vertically by the uses of slots, vanes, controllable gates, baffles and fins.

Examples of conventional circular aircraft include the following:

U.S. Pat. No. 4,312,483—Bostram describes a rotating disc as a wing member primarily for flight stability. The peripheral, concentrated mass of the rotating disc provides no lift except in horizontal flight.

U.S. Pat. No. 4,044,972—Anker-Holth describes a circular winged aircraft with two concentric fixed airfoil wings separated by supporting walls. Ducted air flows over the top surface of a bottom airfoil for partial lift while the main lift is produced by lifting propellers. The ducted air is also used to maneuver the aircraft.

U.S. Pat. No. 3,572,613—Porter describes a hollow rotating circular wing with an upper central opening for air induction through spaced vanes to force air movement over an annular airfoil wing surface. A valving mechanism covers the vane ports for control.

U.S. Pat. No. 3,181,811—Maksim describes a helicopter type aircraft which obtains aerodynamic lift from helicopter type rotary blades increased by inducing air flow through concentric, stacked annular airfoils of decreasing diameter and a plurality of baffles to vary lift by the airfoils. These variable lift airfoils have adjustable pitch features. Also, slots are provided in the large diameter airfoil for additional control.

U.S. Pat. No. 3,041,009—Wharton describes an aircraft using a ring airfoil with a central opening and contra rotating fans located above the airfoil to discharge air down over the airfoil to provide lift. A canopy structure below the airfoil contains flaps which open on engine failure to allow upwardly moving air to flow over the airfoil for descent control. Two adjustable control vanes function to eliminate aircraft rotation due to engine torque.

U.S. Pat. No. 2,468,786—Sharpe describes an aerodynamic impelling device which uses expanding gases from a gas turbine directed over stacked concentric circular airfoils of decreasing diameter to develop lift. No provision is made to control craft rotation caused by turbine engine torque or to meet the need for heat resistant airfoils.

In spite of a long history of circular aircraft with complicated mechanisms for control, none has taken advantage of operating the airfoil section in a regime of maximum lift-to-drag ratio along with the additional effect of the so-called, Coanda "wall effect." Such effect is induced by use of controlled space for fluid movement over and under the airfoil, to obtain high lifting forces for a given air flow over an enclosed stationary annular wing. Thus, the required vertical lifting force for flight is developed with substantially less power than that required to drive a conventional rotating airfoil or propeller. In this way, flow of relatively low volumes of air radially over the full circumference of an annular wing generates lift without need for forward flight of the airfoil.

SUMMARY OF THE INVENTION

In accordance with my invention, I have discovered that greater lift from a circular airfoil can be obtained by using a circular fuselage having approximately the same diameter as the fixed annular wing and having both a central opening and a circumferential opening in the enclosing fuselage to permit air flow both over and under the airfoil. A most particular advantage of fully enclosing the annular wing is in the ability to control flight characteristics of the aircraft without loss of lift at low speeds and under adverse external wind conditions acting on the lift surfaces of the aircraft. This discovery has been tested using different diameter models which demonstrate enhanced flight control. A configuration of this type greatly simplifies the aircraft structure and eliminates complicated valving mechanisms or dependence upon continuous integrity of a rotatable wing, as well as a rotary and counter-rotary support of the fuselage and power plant from the wing.

It is a particular object of the present invention to provide circular aircraft having a fixed circular wing and an enclosing fuselage with a circumferential opening and a central opening in at least one surface for radial air flow over the wing. Such aircraft is capable of hovering, horizontal flight, and lateral movement, as well as vertical take-off and landing, without complicated control mechanisms or dependence on rotary elements for continuous flight. A power source provides the energy to drive an air stream at a sufficient flow rate to make the aircraft operational and is located preferably at the center axis of the aircraft for balance. The few aircraft controls needed are similar to conventional wing design but they are internal of the airframe, and may form an integral part of the circular wing; however, if desired, some control elements may extend into the induced air stream from either the upper or lower portions of the fuselage.

The overall diameter of the aircraft depends on its usage, from a small diameter radio-controlled (R/C) recreational toy to drones, stationary platforms, aerial hoists, freight and passenger carrying craft. Dependent upon weight to strength limitations of the materials of construction, there are no theoretical limits to the craft's dimensions and lifting capacity.

Further objects and advantages of the present invention will become apparent from the following detailed description, with reference to the accompanying drawings which form an integral part of the specification.

DESCRIPTION OF THE PREFERRED EMBODIMENTS

Figure 1:
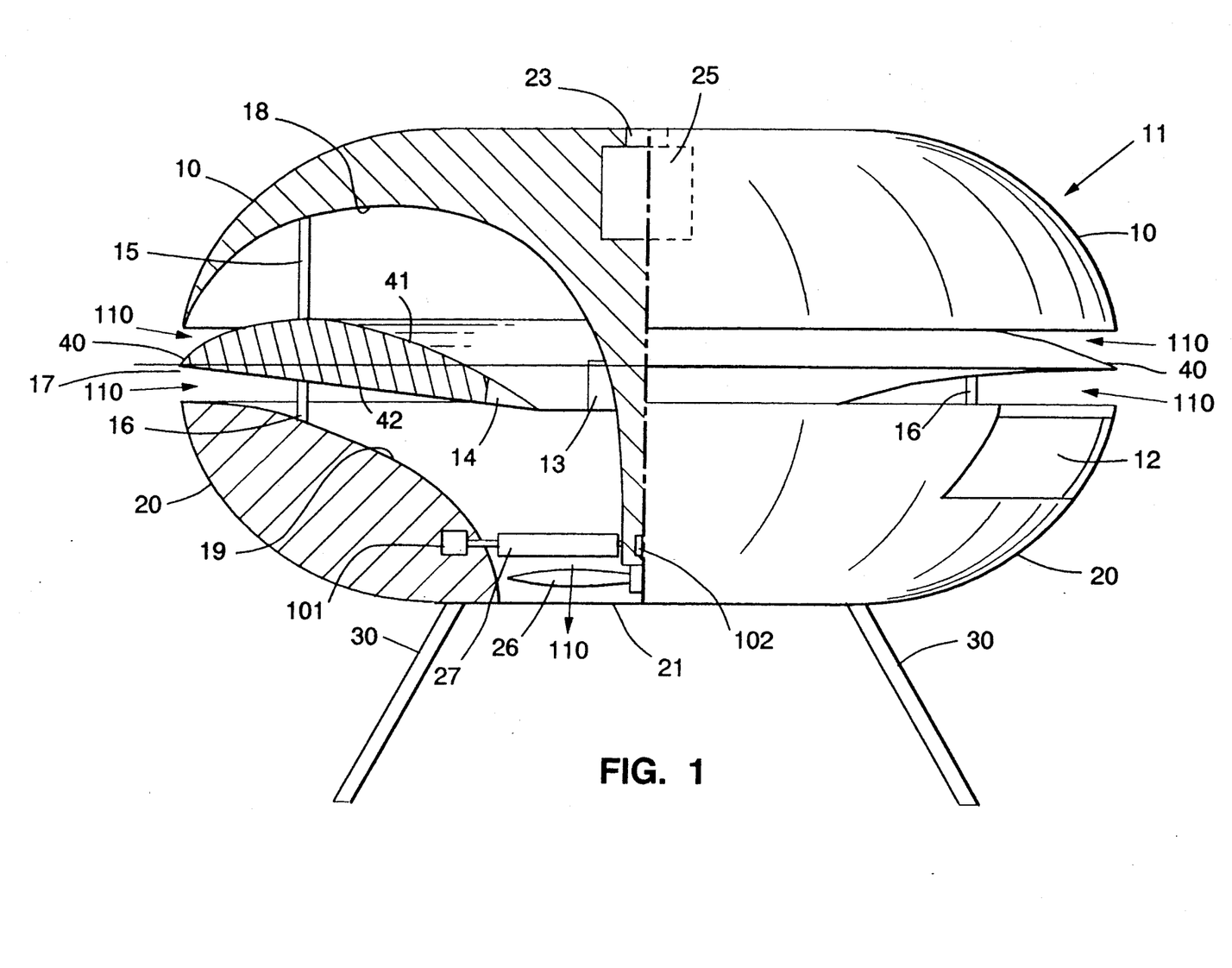
FIG. 1 is a vertical elevation view, partially in cross-section of an aircraft in accordance with the present invention, using bottom exhaust for the induced air flow.

FIG. 1 shows an aircraft in its simplest form in accordance with this invention. Top and bottom sections 10 and 20, respectively, comprise circular fuselage 11 and are axially spaced apart to form a peripheral opening 17 around the full circumference of fuselage 11. Circular fuselage 11 has substantially the same outer diameter as an annular, generally circular airfoil 40. A central axial opening 21 in lower section 20, around the fuselage's vertical axis, as in FIG. 1 or axial opening 23 in upper section 10, as in FIG. 2, permits air flow 110 to be induced radially along the chord of both upper surface 41 and lower surface 42 of airfoil 40 and from around substantially its full circumferential area. Such flow creates the required lift for flight of the aircraft at relatively low air velocities. These high lift forces, generated by relative low volume and low velocity air flow over airfoil 40, are believed to be due to the Coanda effect as noted above. However, whether or not such effect is generated, experimental results indicate that the generated lift is substantially greater than would be expected for the air flow quantity generated by the total output of the power plant generating such flow. Accordingly, it is the configuration of wing 40 as herein disclosed which generates such lifting power, without regard to how it is in fact created. For support on the ground aircraft 11 may include a landing gear 30 shown schematically as a tripod, in its extended, landing position.

High-lift, low velocity annular airfoil 40 which provides lift in this aircraft configuration, is suitably a modified NASA 4412 airfoil section built in a generally circular, annular shape. It contains ailerons 13 and stabilizers 14 which pivot relative to the trailing edge of airfoil 40, but at right angles to each other. These control surfaces are substantially identical so that their respective functions depend upon the direction of flight of circular airfoil 40 and aircraft fuselage 11. Ailerons 13 are pivotable about axes parallel to the line of flight to assist the aircraft to bank left or right. They may be connected such that as one moves up into the air flow, the other moves down to bank the aircraft, as in turning. Stabilizers 14 are likewise connected to pivot about axes perpendicular to the line of flight of the aircraft so that it can be maneuvered up or down in flight. Both can be operated to trim the aircraft while hovering, and as required in flight. Additional control surfaces may be added on larger type aircraft and may be pivotable either as a portion of the wing member or from the upper or lower fuselage sections to effect radial air flow over selected portions of the airfoil or wing.

Circular fuselage 11 comprising top and bottom sections 10 and 20, respectively, enclose generally circular airfoil 40. As shown, both top section 10 and bottom section 20 of circular fuselage 11 have substantially the same outer diameter as circular airfoil 40 and are axially spaced apart by spacers 15 and 16 to form peripheral opening 17 around the full circumference of fuselage 11. The axial width of opening 17 adjacent the outer circumference of airfoil 40 is preferably not greater than the total axial area for effective radial airflow between upper surface 41 and lower surfaces 42 of airfoil 40 and the respective inner surfaces 18 and 19 of top and bottom sections 10 and 20 of fuselage 11. Desirably, inner surface 18 is concavely curved relative to upper surface 41 so that air flow 110 generally expands in volume from intake opening 17, as it radially flows inwardly over a distance related to the curvature of upper surface 41. Similarly, inner surface 19 of bottom section 20 may be convexly curved to form an axially expanding space relative to the form of lower surface 42 of airfoil 40. Thus the generally expanding air flow area from peripheral opening 17 to central axial opening 21 is proportioned to the profile of curvature of airfoil 40. While not shown, if opening 17 is flared outwardly for air intake, the minimum axial area for such flow is at the leading edge of airfoil 40.

Upper and lower spacers 15 and 16, respectively, separate airfoil 40 from upper and lower fuselage sections, 10 and 20, and form required central peripheral opening 17. They also hold airfoil 40 in its necessary relationship to inner surfaces 18 and 19 within fuselage 11. Bolts (not shown) extend through fuselage 10, spacer 15, airfoil 40, spacer 16 and fuselage 20, to hold these parts firmly in the correct positions relative to each other. By locating spacers 15 and 16 circumferentially apart at intervals, lift generated by stationary airfoil 40 is transferred to fuselage 11. Definite relationships between the length of the spacers 15 and 16 and the curvature of airfoil surfaces 18 and 19 induce the desired Coanda effect by such radial air flow over selected portions, or the full, 360° circumferential surfaces of airfoil, or wing member, 40. During certain maneuvers, this ratio may be changed in flight to enhance control by adjusting such spacing or airfoil curvature mechanically, pneumatically or hydraulically. In normal flight, (takeoff, forward, reverse, hovering and landing) radial air movement 110 over airfoil surface 40 is maintained by propeller 26, driven by engine 25. As in conventional fixed wing, or rotary wing aircraft, the propeller may have fixed or variable pitch blades. Lateral movement of the aircraft may also be obtained by mounting movable vanes 27 and 28 to pivot at right angles to each other. Vane 27 is pivotable about an axis generally parallel to the line of flight and also may act as a rudder. Both vanes 27 and 28 are operable to control rotation of the aircraft against engine torque.

The forward and backward movement of the aircraft is by movable vane 28 mounted to pivot about an axis generally transverse to the line of flight. Additional vanes, similar to the slots of a Levolor blind, may be added, but for simplicity only a few are shown. Movable vane 27 is controlled as by actuator 101 in response to pilot command. Vane 28 has a similar actuator 102 that can be operated in unison with vane 27 as needed, or it can be operated separately. Although vanes 27 and 28 are separate from airfoil 40 they operate to alter air flow 110 through the fuselage in the same manner as those pivotally mounted o the wing.

In FIG. 1, air flow 110 is drawn radially inwardly through the perimeter opening between fuselage sections 10 and 20. Air is exhausted downwardly through central opening 21 in lower fuselage 20 after travelling over both the upper and lower surfaces of airfoil 40, as modified by control vanes 13, 14, 27 and 28. A pilot's compartment 12 is shown schematically as being located in lower fuselage 20.

Figure 2:
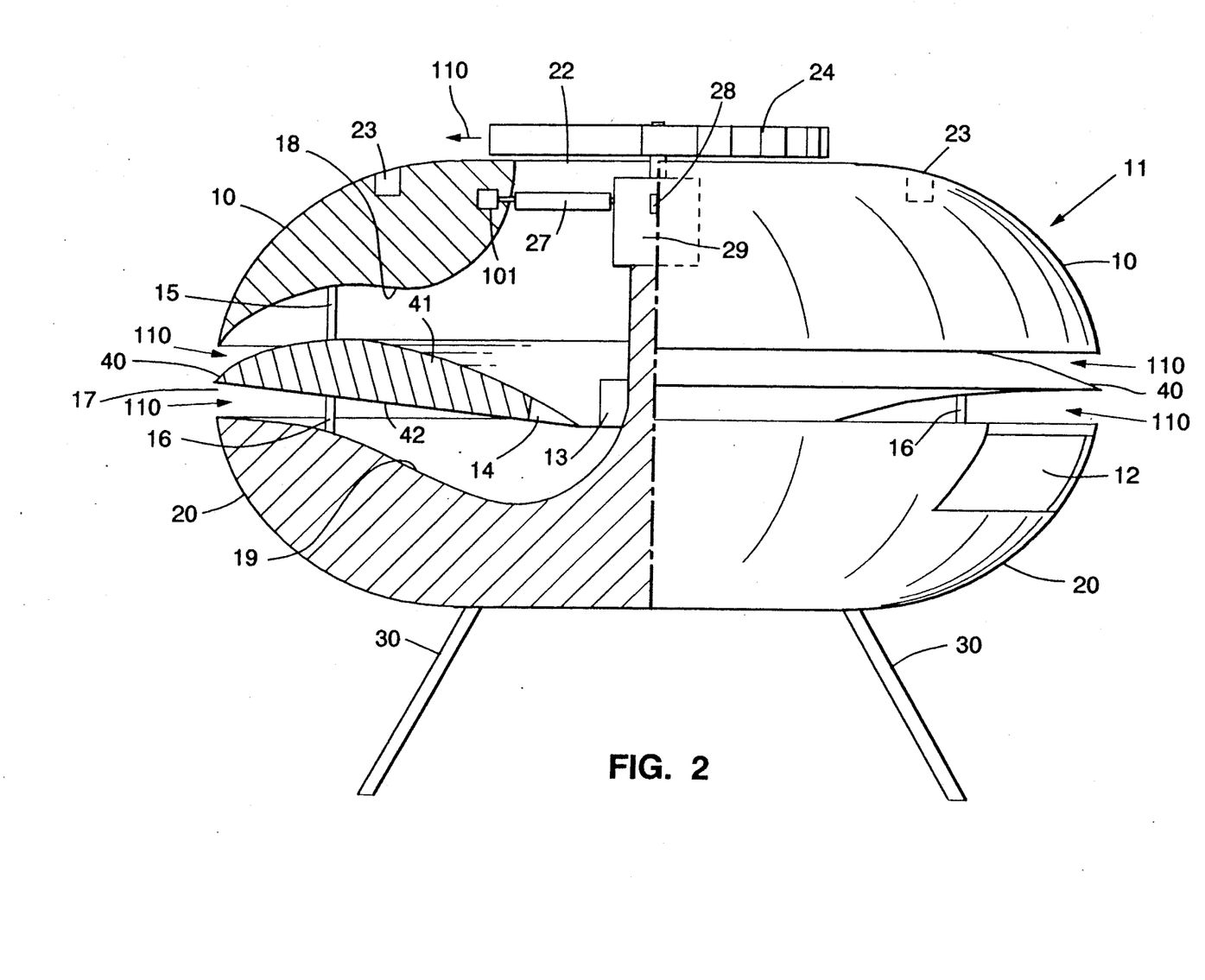
FIG. 2 is a vertical elevation view, partially in cross-section of an aircraft in accordance with this present invention, using top exhaust for air flow.

FIG. 2 is similar to FIG. 1, except that air flow 110 is directed out of the top of central opening 22 in upper fuselage section 10 of the aircraft. A multi-blade radial fan 24 is driven by engine 29 in this configuration to produce air movement 110 with the attendant Coanda "wall effect" over the surfaces 41 and 42 of wing 40. Such Coanda force is effective at certain air velocities and is induced by the tendency of air flow 110 to travel close to the airfoil surfaces even though the curvature of surfaces 41 and 42 are several degrees away from the main axis of air flow across such surfaces. Thus in the arrangements shown, the generally radial air flow 110 over wing 40 even at low velocities creates the desired difference in air pressure between the upper and lower surfaces 41 and 42 to create lift of airfoil 40 and fuselage 11.

Figure 3:
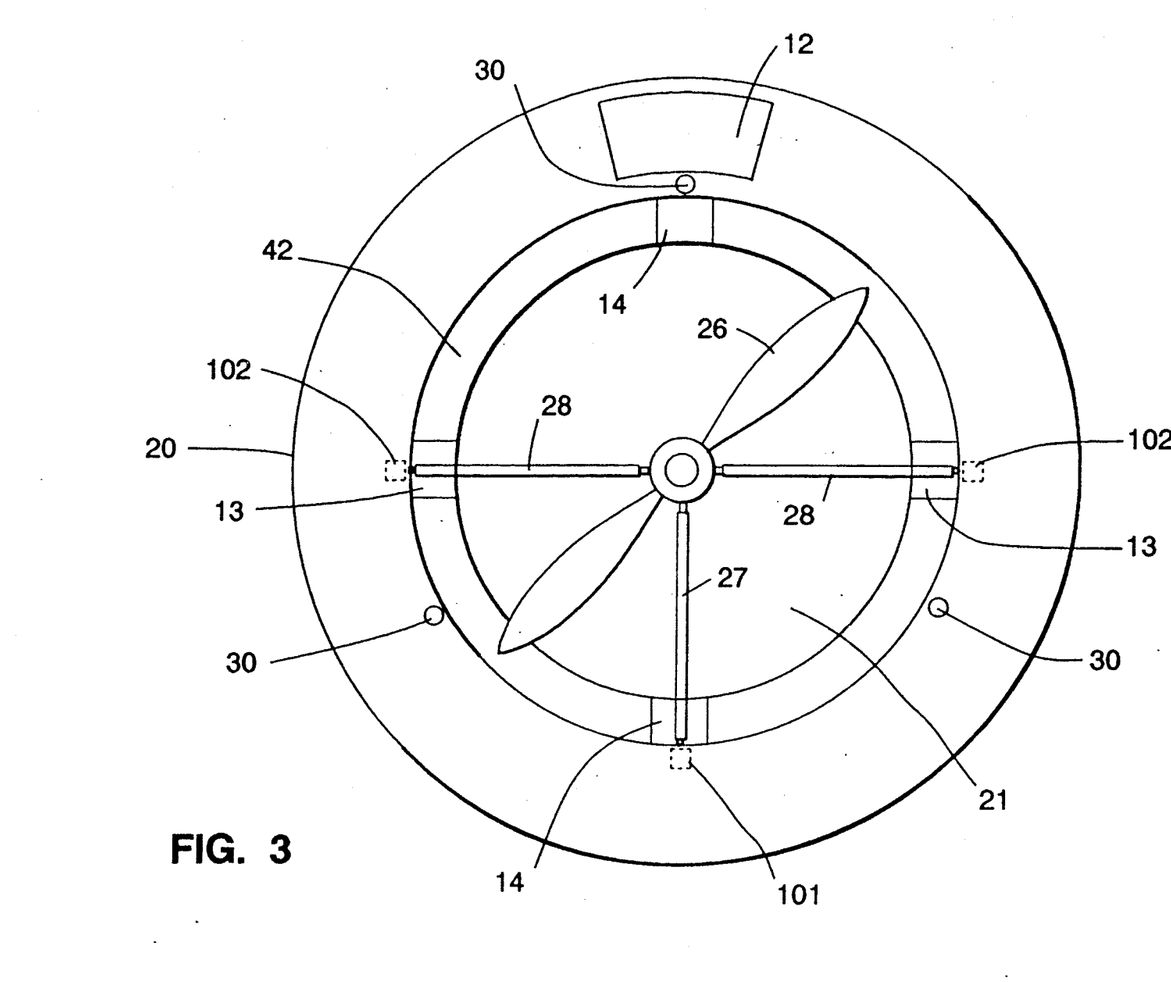
FIG. 3 is a bottom plan view of the aircraft shown in FIG. 1 Aircraft.

FIG. 3 is a bottom plan view of FIG. 1 and shows a suitable layout of control vanes 27, 28 as well as control surfaces 13 and 14 in more detail. Although only the pilot's area is shown, as at 12, other access openings and areas may be provided for fuel tanks, freight, passengers and general utilities in either or both fuselage sections 10 and 20.

Figure 4:
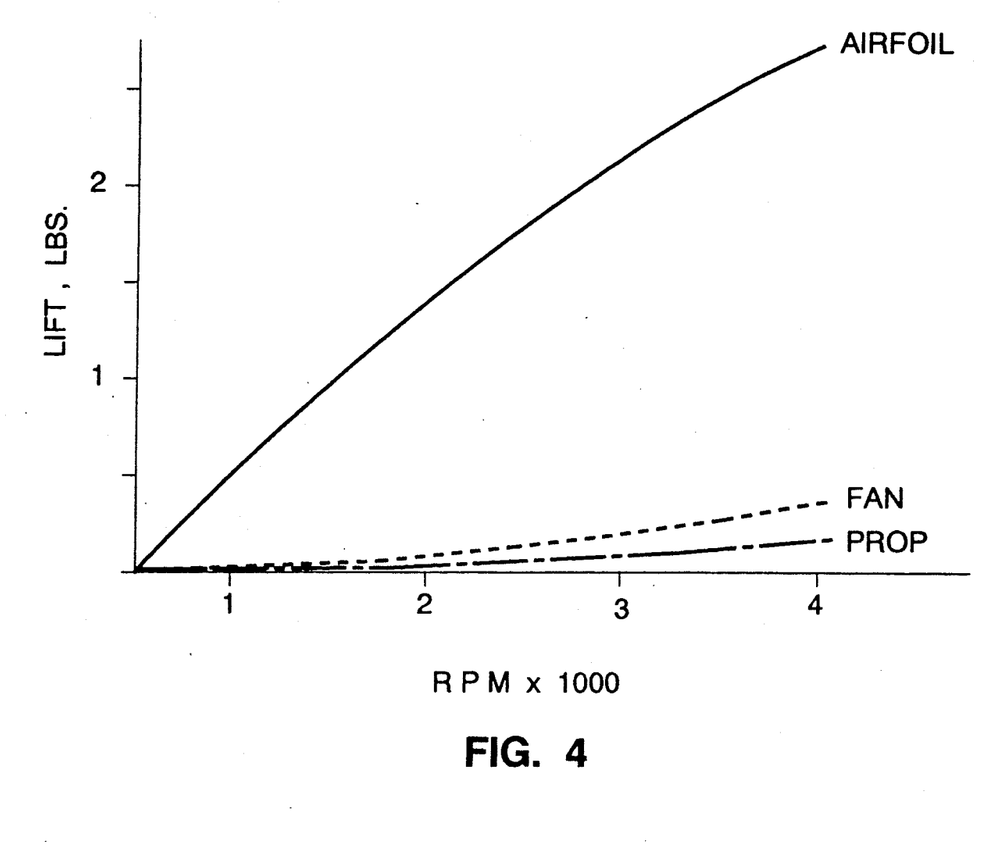
FIG. 4 is a graphic representation of the relative contribution to lift (in pounds) from an airfoil of the present invention using a propeller, as compared to a propeller or a fan alone (in RPM).

FIG. 4 is a graphic representation of the lift that is produced by airfoil 40 as compared to the lift of propeller 26 or fan 24, alone. It will be seen that air flow created by application of power generated by an engine driven fan or propeller, or by a jet engine lift is developed over the full circumference of any given diameter of an annular wing aircraft, constructed in accordance with the present invention. Such lift substantially exceeds the lift power or thrust of a propeller or fan alone over the same range of propeller or fan speeds.

While not illustrated, it will be understood that lift and propulsion of aircraft of the same fuselage configuration may be generated by inverting the leading and trailing edges of annular wing member 40. That is, the leading edge may be at the central opening of the fuselage and the trailing edge adjacent circumferential opening 17 between the upper and lower sections of the fuselage. However, in general, lift of an airfoil is generated by approximately 30% of the chord (width) of the wing. For this reason, maximum lift is obtained with radial air flow from the perimeter to the open center of the air foil due to the greater length of such chord at the outer diameter of the annular wing.

In ultralight aircraft having a single engine, it is known to use parachute means deployable by pilot action for controlled descent. In the embodiment of FIG. 1, parachute means 23 provides such a capability. In larger aircraft, multiple engines may be selectively used to drive propeller 26 or fan 24 either singly or redundantly for low velocity descent.

Figure 5A:
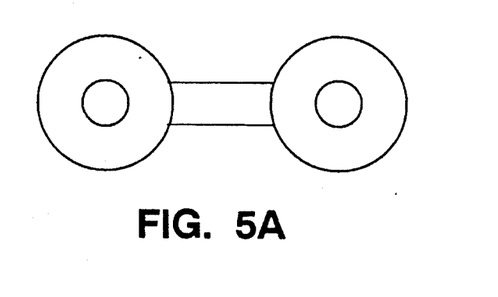
FIGS. 5A to 5D schematically illustrate arrangements of multiple circular aircraft of the present invention joined together to form composite, multiple lift aircraft and respectively show as in FIG. 5A, dual, as in FIG. 5B, triangular, as in FIG. 5C, square or rectangular and as in FIG. 5D, pentagonal, arrangements of such aircraft.
Figure 5B:
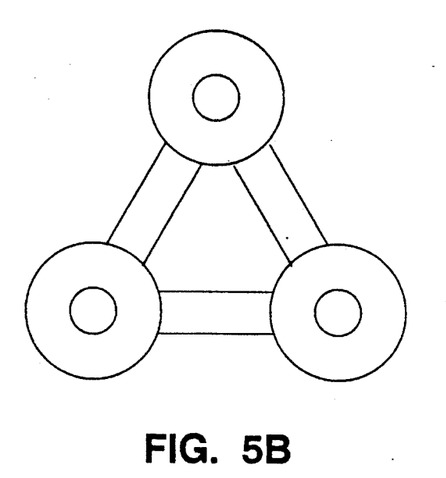
Figure 5C:
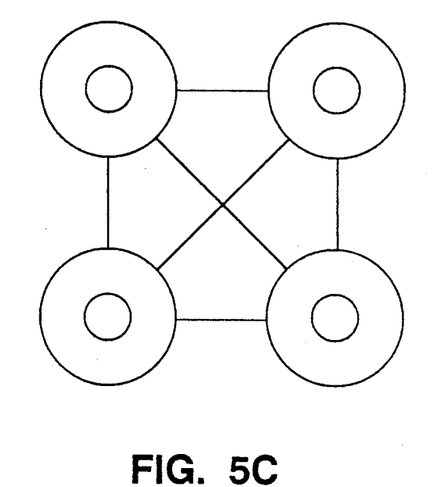
Figure 5D:
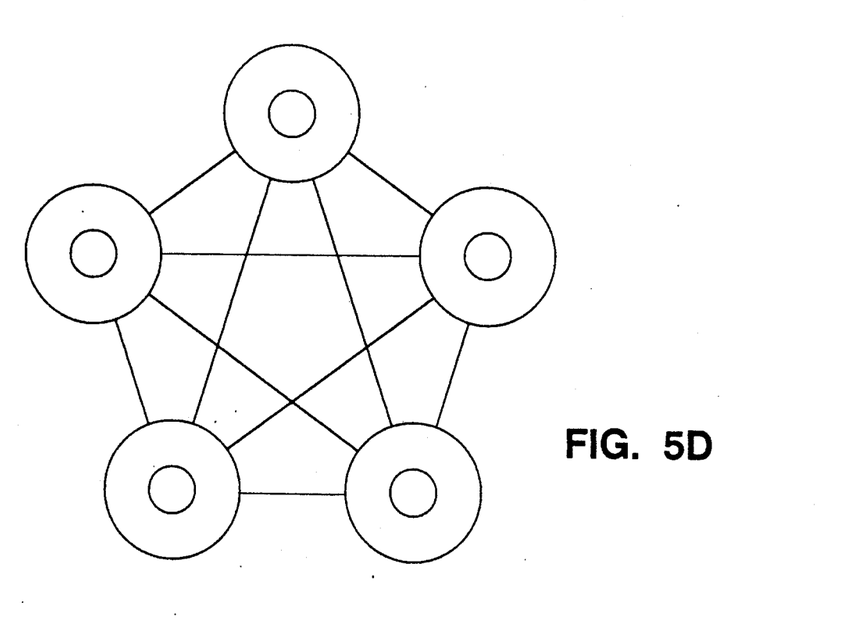

As indicated in FIGS. 5A to 5D two or more fuselages 10 having fixed annular airfoils may be joined together to form a composite, multiple lift aircraft for increased lift capacity of the assembly. As required, such configuration may be a pair of dually joined fuselages 10, as in FIG. 5A, triangularly joined fuselages as in FIG. 5B; four fuselages joined as a square or rectangle as in FIG. 5C, or multiple fuselages may be joined in a poly-pointed configuration, such as the five fuselages, arranged in a star shape, as shown in FIG. 5D.

Various modifications and changes in the apparatus of the present invention will become apparent to those skilled in the art from the above-described embodiments. While the preferred embodiments have been described, it is intended to claim all such modifications falling within the true scope of the invention as defined by the following claims.

I claim:

1. A heavier-than-air aircraft having a generally circular external configuration comprising a single annular airfoil forming a stationary circumferential lift member for said aircraft;

a circular fuselage having an upper section and a lower section of substantially the same diameter overlying and underlying the outer periphery of said annular airfoil, said annular airfoil being affixed to each of said upper and lower sections of said circular fuselage at circumferentially spaced-apart locations to form axial openings in said fuselage above and below said annular airfoil and around the periphery thereof, said axial openings above and below the periphery of said airfoil being not greater than the axial spacing along the radial chords of the upper and lower surfaces, respectively, of said annular airfoil from said overlying and underlying surfaces of said upper section and said lower section, respectively, of said fuselage for radial air flow through said fuselage over and under the full circumference of said annular airfoil;

said circular fuselage having a central opening formed in at least one surface thereof to permit air to flow through said fuselage between said central opening and the peripheral axial opening and radially over the upper and lower surfaces of said annular airfoil;

air drive means supported in a central portion of said fuselage member for generating an axial flow of air through the open inner circular area of said annular airfoil and said central opening in said fuselage to generate radial air flow over the circumference of the lift surfaces of said annular airfoil, and control surface means pivotable relative to portions of the radial surface of said annular airfoil to modify radial air flow through said axial openings between said upper and lower sections of said fuselage and over said airfoil for directing the flight path of said aircraft.

2. A circular aircraft in accordance with claim 1 wherein said control surface means are within the diameter of said circular fuselage and pivotally connected to said annular airfoil to produce lateral, vertical, horizontal or hovering flight without external appendages to said circular fuselage of said aircraft and said control surface means are operable independently or collectively to control or enhance lift of said airfoil and additional control surface means within said axial opening operable to coordinate banking, load changes, wind gusts and maneuvering of said aircraft.

3. A circular aircraft in accordance with claim 1 wherein at least one of the surfaces of said stationary annular airfoil is variable in curvature to change air flow thereover to vary the lift to drag profile thereof.

4. A circular aircraft in accordance with claim 1 wherein said central opening in said circular fuselage is in said upper section thereof whereby air for flow over said annular airfoil is expelled from or drawn into said circular aircraft axially to the upper surface of said fuselage.

5. A circular aircraft in accordance with claim 1 wherein said central opening in said circular fuselage is in said lower section thereof whereby air for flow over said annular airfoil is expelled from or drawn into said circular aircraft axially to the lower surface of said fuselage.

6. A circular aircraft in accordance with claim 1 wherein said annular airfoil for producing lift and propulsion of said aircraft includes control means for selectively generating lift by radial air flow passing thereover either inwardly or outwardly with air exhaust being expelled either along the vertical axis of said fuselage or around said peripheral openings in said perimeter of said fuselage, said control means including moveable control surfaces cooperating with said annular airfoil to perform the functions of slats, flaps, air brakes, spoilers, ailerons, or air flow directors to control or enhance lift of said annular airfoil comparable to a conventional aircraft wing.

7. An aircraft wherein at least two fuselages in accordance with claim 1 are joined together to form a composite, multiple lift aircraft.

8. A composite, multiple lift, aircraft in accordance with claim 7 wherein a multiplicity of said annular airfoil aircraft in accordance with claim 1 are selectively joined to form a triangular, square or poly pointed configured composite aircraft of increased lifting capability.

9. A circular aircraft for vertical, horizontal or hovering flight, comprising single an annular wing member affixed at circumferentially spaced apart locations to a circular fuselage member of substantially the same diameter as said wing member, said circular fuselage being axially spaced from both the upper and lower surfaces of said annular wing member to form a circumferentially open area above and below the outer periphery of said wing member, said circumferential open area extending radially and circumferentially inwardly at an axial distance above and below said annular wing member not less than the respective axial distances above and below the outer periphery of said wing member, a central open area in at least one surface of said fuselage member generally concentric with, and having a similar diameter to, the central open area of said annular wing member, air propulsion means supported coaxially within said fuselage member, said propulsion means comprising power means for generating air flow, selected from the group consisting of propeller means, fan means and reactor gas means, adequate to create radial air flow through said circumferential open area and over said fixed annular wing member sufficient to lift said aircraft, flight control means having surface areas movable relative to portions of said annular wing member to modify selected portions of said radial air flow through said cylindrical open area and over said wing member, fuselage piloting means for controlling operation of said propulsion means and said flight control means, said fuselage member including load carrying means for support of said flight control means and fuel for said propulsion means, and said propulsion means producing adequate air flow simultaneously over said annular wing member and said control means to permit lateral, vertical, horizontal or hovering flight capabilities as well as normal or reverse propulsion of said aircraft by operation of said piloting means.

10. A circular aircraft in accordance with claim 9 wherein said surface areas of said flight control means are pivotally connected to said annular wing member to produce lateral, vertical, horizontal or hovering flight without external appendages to said circular fuselage of said aircraft and said flight control means are operable independently or collectively to control or enhance lift, and additional flight control means operable to coordinate banking, load changes, wind gusts and maneuvering of said aircraft.

11. A circular aircraft in accordance with claim 9 wherein at least one of the surfaces of said fixed annular wing member is variable in curvature to change air flow thereover to vary the lift to drag profile thereof.

12. A circular aircraft in accordance with claim 9 wherein said central open area in said circular fuselage is in the upper surface thereof whereby air for flow over said annular wing member is expelled from or drawn into said circular aircraft axially to the upper surface of said fuselage.

13. A circular aircraft in accordance with claim 9 wherein said central opening in said circular fuselage is in the lower surface thereof whereby air for flow over said annular wing member is expelled from or drawn into said circular aircraft axially to the lower surface of said fuselage.

14. A circular aircraft in accordance with claim 9 wherein said annular wing member and said air propulsion means for producing lift and propulsion of said aircraft include control means for selectively generating lift by radial air flow passing thereover either inwardly or outwardly with air exhaust being expelled either along the vertical axis of said fuselage or at said circumferential open area of said fuselage, and said flight control means includes moveable control surfaces cooperating with said annular wing member to perform the functions of slats, flaps, air brakes, spoilers, ailerons, or air flow directors to control or enhance lift of said annular wing member comparable to a conventional aircraft wing.

15. An aircraft wherein at least two fuselages in accordance with claim 9 are joined together to form a composite, multiple lift aircraft.

16. A composite multiple lift aircraft in accordance with claim 15 wherein a multiplicity of the fuselage said annular airfoil aircraft in accordance with claim 1 are selectively joined to form a triangular, square or polypointed configured composite aircraft of increased lifting capability.

17. A helicopter-like aircraft comprising a circular fuselage including a generally circular overlying portion and a generally circular underlying portion, said portions being of substantially the same diameter and coaxially spaced apart from each other to form a cylindrical open volume within said fuselage, the opposing surfaces of said portions extending outwardly from the axes thereof toward the peripheries of said portions and forming a circumferential opening in said fuselage around the periphery of said cylindrical volume, having an axial width not greater than the axial width of said cylindrical volume over its radial span, one of said portions having a coaxial central opening therethrough for radial flow of air through said cylindrical volume, between said circumferential opening said central opening, a single annular airfoil having a peripheral diameter not greater than the diameter of said portions and axially spaced therebetween so as form radial airflow passageways over and under said airfoil to generate lift for said aircraft, the central portion of said annular airfoil having a diameter substantially the same as the diameter of said central opening in said one portion of said fuselage, said circumferential axial opening and said central opening thereby substantially limiting airflow through said cylindrical volume to radial flow over said annular airfoil, airflow generating means supported by said fuselage for pumping air generally coaxially through said central opening in said fuselage and said central portion of said airfoil to induce radial air flow over and under substantially the full circumference of said annular airfoil, flight control surfaces within said cylindrical volume pivotable relative to portions of the radial surface of said annular airfoil for directing the flight of said aircraft, and piloting means within the area of said circular fuselage for controlling said flight control surfaces and said airflow generating means.

18. An aircraft in accordance with claim 17 wherein the axial spacings of the overlying and underlying portions of said circular fuselage from said single annular airfoil increase toward the concentric axes of said fuselage and said airfoil.

19. An aircraft in accordance with claim 17 wherein the axial spacing thereof of said single airfoil from said overlying and underlying portions of said fuselage progressively decreases radially from the concentric axes toward the peripheries.

* * * * *